Nov. 6, 1956  R. F. MARTIN  2,769,273

TRAP

Filed Feb. 28, 1952  2 Sheets-Sheet 1

INVENTOR.
Raymond F. Martin
BY
Henry G. Dybvig
HIS ATTORNEY

Nov. 6, 1956 R. F. MARTIN 2,769,273
TRAP
Filed Feb. 28, 1952 2 Sheets-Sheet 2
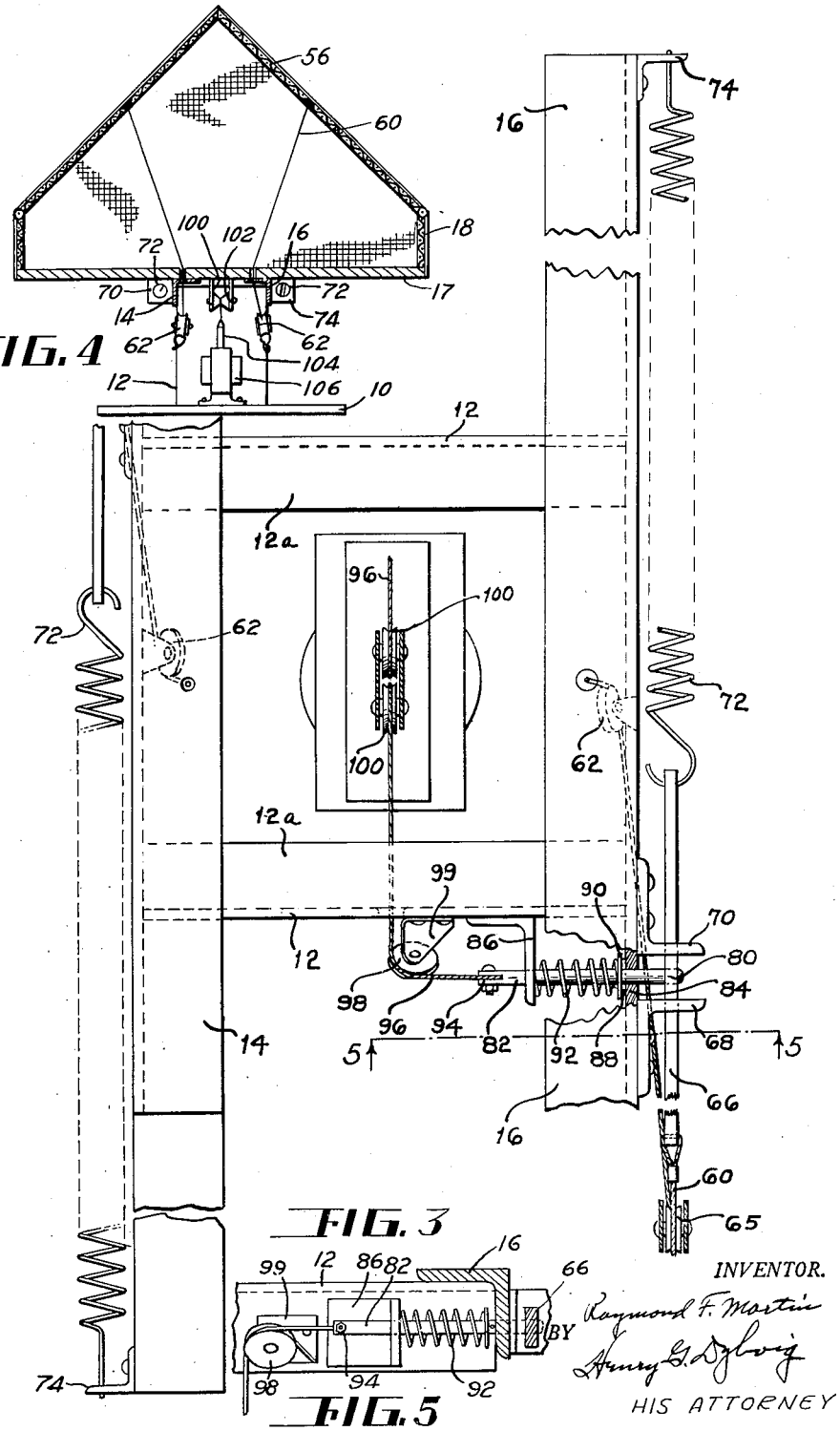
INVENTOR.
Raymond F. Martin
BY
Henry G. Dybvig
HIS ATTORNEY United States Patent Office 2,769,273
Patented Nov. 6, 1956

2,769,273

TRAP

Raymond F. Martin, Fairborn, Ohio

Application February 28, 1952, Serial No. 273,789

9 Claims. (Cl. 43—61)

This invention relates to a trap and more particularly to a remotely controlled trap that is adapted for trapping birds, although it is not necessarily so limited.

An object of this invention is to provide a remote controlled, electrically operated trigger, for springing the trap.

Another object of this invention is to provide a remote electrically controlled trap, wherein the birds or animals to be trapped enter from the top, and, upon the trap being sprung, a closure or a pair of closures are snapped into position to thereby trap the prey.

Another object of this invention is to provide a trap-actuating mechanism, wherein the trap is held in open position by springs and is actuated into closed position by other springs sufficiently strong to overcome the force of the first mentioned springs.

Another object of this invention is to provide an opening in a trap, which opening is normally closed by a slitted diaphragm, the slits of which permit insertion of an arm through the opening to catch the prey and close the gap between the opening and the arm while removing the prey, so as to prevent other prey from escaping through the opening.

Other objects and advantages reside in the construction of parts, the combination thereof and the mode of operation, as will become more apparent from the following description.

In the drawings,

Figure 3 is a fragmentary, enlarged, detail view of the actuating mechanism, showing parts in section and other parts broken away.

Figure 4 is a transverse sectional view of the trap taken adjacent the member 56 substantially on the line 4—4 of Figure 2, showing the relation between the lid, sides, floor and the supporting angles.

Figure 5 is a fragmentary, cross sectional view taken substantially on the line 5—5 of Figure 3.

Figure 1:
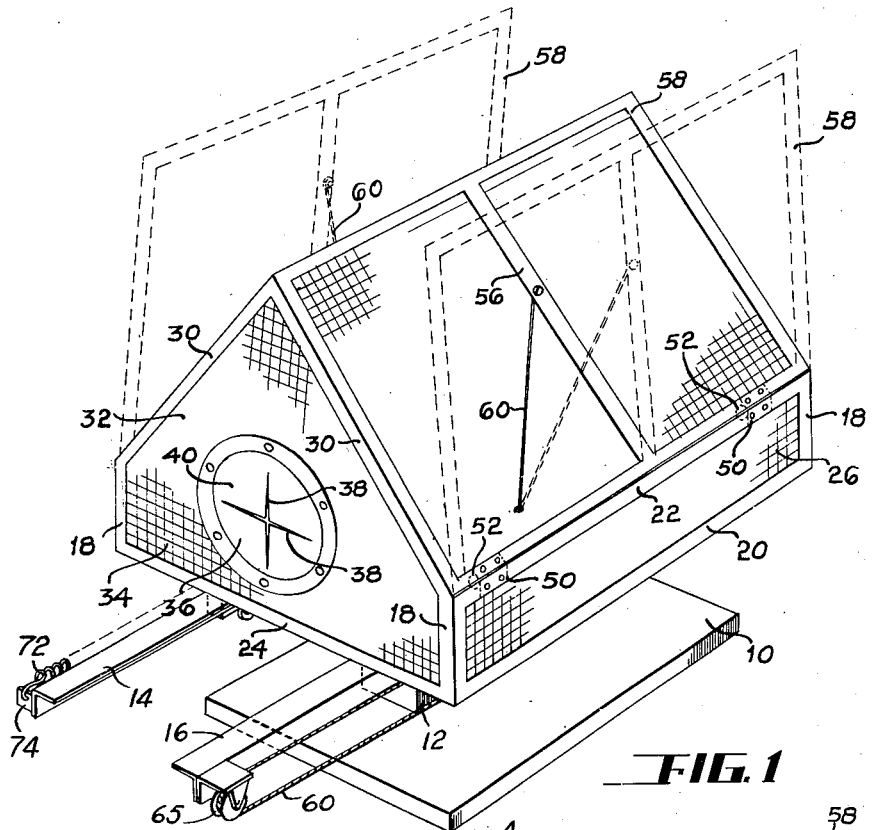
Figure 1 is a perspective view showing the trap in closed position, with the trap doors shown in dotted position in readiness to be closed.
Figure 2:
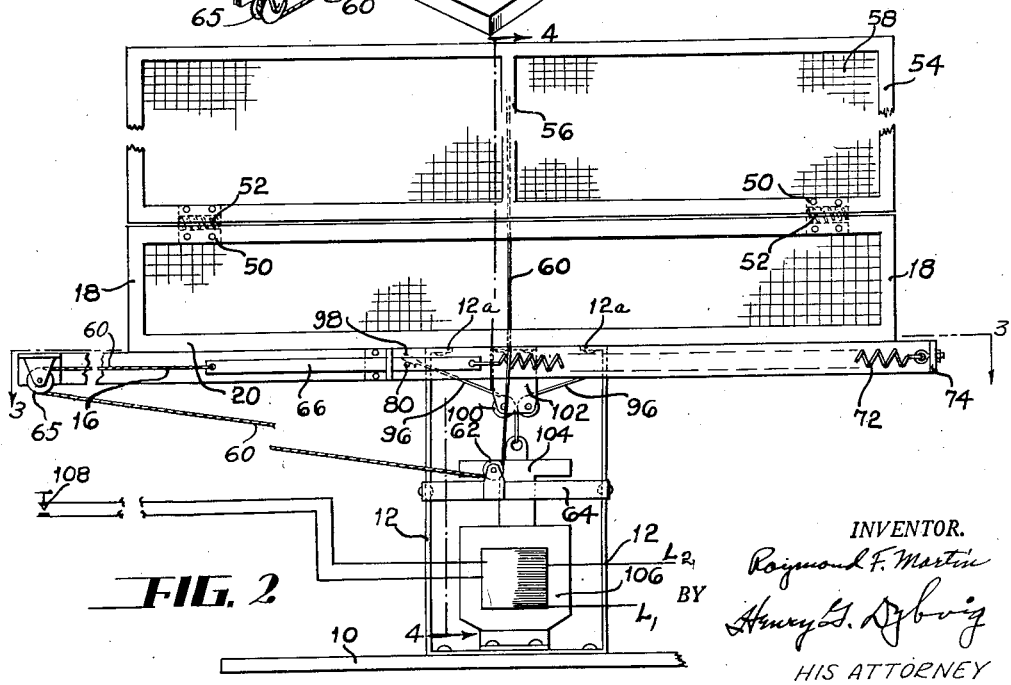
Figure 2 is a side elevational view of the trap, showing one of the trap doors in open or set position in readiness to catch the prey, the doors being held in this position by suitable torsion springs.

Referring to the drawings, the trap includes a base member or platform 10 having mounted thereon a substantially U-shaped bracket 12, the legs of which are vertically disposed and terminating at their upper ends in horizontally disposed flange portions 12a. A pair of angle irons 14 and 16 are mounted upon the flange portions 12a. These angle irons 14 and 16 form sill members or a supporting framework for the main body of the trap.

The trap is provided with a floor 17 resting upon the angle irons 14 and 16 and secured thereto in any suitable manner. If the floor is a metal floor, as for example sheet iron, the floor may be spotwelded to the sill members 14 and 16.

The superstructure of the trap simulates a bird cage. It is provided with angle iron corner posts 18, one in each corner. These corner posts are integral with or attached to side members 20 and 22 and the end members 24. The side members 20 and 22 cooperate with the corner posts 18 to support a wire mesh screen 26. Each of the corner posts supports a rafter-like member 30, angularly disposed so as to form a gable 32. The ends are closed by a screen 34 and one end is provided with an opening in which is mounted a flexible slitted diaphragm or member 36, such as a sheet of rubber, provided with radially disposed slits 38 providing substantially triangular sectors or portions 40, the apices of which come to a common point in the center and at the point of intersection of the slits 38.

Each side frame member 22, which may be referred to as a rail member, supports a pair of hinges 50, each provided with a torsion spring 52. Each pair of hinges supports a closure member consisting of a frame 54 provided with a center bar 56 and forming a support for a screen or wire mesh closure or cover 58. The springs 52 on the hinges have been so designed that the springs 52 bias the two covers or closures, one on either side, into open position, as shown in dotted lines in Figure 1. The hinges 50 may be conventional screen door hinges, reversely mounted, so that instead of closing the closure, the hinges bias the closure into open position. The position of the closures forming the top of the trap is controlled by a control mechanism that will now be described.

Each of the covers 58 is controlled by a cord actuated by a spring in tension. Only one of the cords and means for operating it will be described, in that both cords and operating means are substantially identical, one controlling the cover 58 to the right and the other controlling the cover 58 to the left, as viewed in Figure 1. A cord 60 is attached near the center of member 56 extending across the mid-point of its cover 58. This cord passes downwardly through an aperture in the floor and is trained over a pulley 62 secured to a frame member 64, which frame member is attached to the legs 12. The cord 60 extends from the pulley 62 to a pulley 65 mounted on the side of each of the angle members 14 and 16, the cord being secured to a bar 66 slidably mounted in a pair of brackets 68 and 70, as best seen in Figure 3. The bar 66 is connected to one end of a tension spring 72 having its other end attached to a bracket 74 mounted on the end of the angle iron 14 or 16 as the case may be. The bar 66 is provided with an aperture 80 receiving a pin 82 extending through a vertically disposed flange 84 of the angle iron 16 and through an aperture in a bracket 86 attached to one of the legs of the U-shaped bracket 12.

The pin 82 is provided with a transverse key 88, against which abuts a washer 90, a spring 92 is positioned between the washer 90 and the bracket 86 and urges the pin 82 to the right, as viewed in Figure 3, into the aperture 80 provided therefor in member 66. The pin 82 is provided with a bifurcated end 94, having attached thereto a cord 96 passing over a pulley 98 attached in a bracket 99 secured to a leg of member 12, the cord passing over a second pulley 100 mounted in a bracket 102 attached to the undersurface floor of the trap, the cord extending downwardly and attached to the armature 104 of an electromagnet 106. The electromagnet is energized from any suitable source of power and the circuit through the electromagnet 106 is controlled by a remotely controlled switch 108, so that when the switch 108 is closed, the electromagnet is energized to pull the armature 104 downwardly, thereby actuating the cord 96, withdrawing the pins 82 from members 66, so as to cause the two springs 72 only one of which has been shown, to slam the two cover members from the dotted position shown in Figure 1 to the full line position shown in the same figure, to thereby close the trap.

By this arrangement, it is possible to locate the switch in a house, in a shed, in a blind or in some other remote or concealed place. By placing feed or bait in the trap periodically, the birds will soon become accustomed to the trap and will flock to the trap when fed. By first using the trap as a feeding place for the birds, it is possible for the trapper to close the switch, thereby releasing the pins 82 so as to cause the tension of the springs 72 to slam the covers into closed position. The birds caught in the trap may be removed by inserting the hand and the arm through the flexible opening in member 36.

The trap may readily be re-set by actuating members 66 towards one end of the trap until the pin or plunger 82 drops into the aperture in the bar 66. There is one bar for each side of the trap. By this arrangement, either one or both sides may be opened up, depending upon the particular requirements.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. A remotely controlled trap including a base, a U-shaped standard mounted on said base, the upper ends of the legs of the U-shaped standard terminating in reentrant flanges, a frame structure mounted upon the reentrant flanges, said frame structure including a pair of angle irons, a floor mounted upon the angle irons, side and end walls projecting upwardly from the floor, and a lid for covering the top of the side and end walls, means positioned in one of said side walls whereby trapped birds may be removed, said lid being pivotally mounted on the frame structure, a spring for biasing the lid member into open position and remotely controlled means for closing the lid member, said remotely controlled means including an electromagnet, means for energizing said electromagnet, a movably mounted bar, a spring for urging said movably mounted bar in one direction, means for locking the movably mounted bar with the spring in tension, connecting means for connecting the locking means and the electromagnet so that as the electromagnet is energized the locking means releases the movably mounted bar, and means for connecting the movably mounted bar to the lid so that the spring of the movably mounted bar closes the lid against the force of the spring holding the lid open.

2. A remotely controlled bird trap according to claim 1, wherein the electromagnet is mounted upon the bight of the U-shaped standard so as to be positioned between the legs of the standard.

3. A remotely controlled bird trap according to claim 1, wherein the means for locking the movably mounted bar with the spring in tension includes a spring urged pin projecting into an aperture in the movably mounted bar, and a cord having one end connected to the pin and the other end connected to the armature of the electromagnet so that as the electromagnet is energized the armature withdraws the pin from the aperture in the movably mounted bar to thereby spring the trap.

4. A remotely controlled bird trap according to claim 1, wherein the movably mounted bar is mounted for movement in a horizontal direction, and a cord for interconnecting the movably mounted bar to the lid so that as the movably mounted bar is released the spring urging the movably mounted bar in one direction causes the movably mounted bar to pull the cord to thereby close the lid.

5. A remotely controlled bird trap according to claim 1, wherein said means in one of the side walls of the trap includes an opening therein and a resilient closure for the opening, said resilient closure consisting of an elastic diaphragm member provided with transversely disposed slits that permit the insertion of a hand and arm through the slits, the elasticity of the diaphragm member permitting the sectors between the slits to yield.

6. A remotely controlled trap including a frame structure, legs for supporting the frame structure, said frame structure including a pair of angle irons, a floor mounted upon the angle irons, sides and ends projecting upwardly from the floor, and a lid for covering the top of the sides and ends, said lid being pivotally mounted on the frame structure, a spring for biasing the lid member into open position, and remotely controlled means for closing the lid member, said remotely controlled means including an electromagnet, a movably mounted bar, a spring for urging said movably mounted bar in one direction, means for locking the movably mounted bar with the spring in tension, connecting means for connecting the locking means and the electromagnet so that as the electromagnet is energized the locking means releases the movably mounted bar, and means for connecting the movably mounted bar to the lid so that the spring of the movably mounted bar closes the lid against the force of the spring holding the lid open.

7. In a remotely controlled trap comprising an enclosure, a lid for covering the top of said enclosure, said lid being pivotally mounted on the enclosure, a spring normally biasing said lid member into open position, remotely controlled means for closing said lid member, said remotely controlled means including an electric circuit including an electromagnet, mechanically operated locking means, said electromagnet releasing said locking means upon the electromagnet being energized, and a torsion spring closing said pivotally mounted lid when the electric circuit is closed to energize said electromagnet.

8. A remotely controlled trap including a base, a U-shaped standard mounted on said base, a housing mounted on said U-shaped standard, said housing comprising an enclosure, provided with a normally open lid, means operatively connected to said lid for closing the same, an electromagnet, said means including a normally inoperative spring, means for energizing said electromagnet, said electromagnet being operatively connected to said spring and adapted to release said spring so as to close the normally open lid.

9. In a trap comprising an enclosure, normally open lids, said lids being provided with springs biasing the lids to open position, means for closing said lids, said means comprising a pair of springs adapted to close said lids, releasable locking means for maintaining said pair of springs in normally inoperative position, an electromagnet, and means for energizing the electromagnet whereby when the electromagnet is energized it will be adapted to release said locking means to permit said pair of springs to operate and thereby close said lids.

References Cited in the file of this patent

UNITED STATES PATENTS

| 1,391,489 | Nawracaj | Sept. 20, 1921 |
| 1,488,312 | Bronson | Mar. 25, 1924 |
| 2,537,209 | Conley | Jan. 9, 1951 |

FOREIGN PATENTS

"Complete American Trapper" (Gibson). Published by James Miller, New York, 1876. (Page 126 relied on.)